(12) United States Patent
Hiruma et al.

(10) Patent No.: US 9,718,186 B2
(45) Date of Patent: Aug. 1, 2017

(54) ROBOT

(71) Applicant: JANOME SEWING MACHINE CO., LTD., Tokyo (JP)

(72) Inventors: Kenichiro Hiruma, Tokyo (JP); Masakazu Shimbara, Tokyo (JP); Yoshikazu Suganuma, Tokyo (JP)

(73) Assignee: JANOME SEWING MACHINE CO., LTD., Tokyo (JP)

( * ) Notice: Subject to any disclaimer, the term of this patent is extended or adjusted under 35 U.S.C. 154(b) by 186 days.

(21) Appl. No.: 14/683,536

(22) Filed: Apr. 10, 2015

(65) Prior Publication Data

US 2016/0101522 A1 Apr. 14, 2016

(30) Foreign Application Priority Data

Oct. 14, 2014 (JP) .................................. 2014-209690

(51) Int. Cl.
*B25J 9/16* (2006.01)

(52) U.S. Cl.
CPC ............ *B25J 9/1664* (2013.01); *Y10S 901/02* (2013.01); *Y10S 901/03* (2013.01)

(58) Field of Classification Search
None
See application file for complete search history.

(56) References Cited

U.S. PATENT DOCUMENTS

| 4,825,394 A * | 4/1989 | Beamish ................ B25J 9/1697 356/147 |
| 7,278,501 B2 | 10/2007 | Mori et al. |
| 2010/0326244 A1* | 12/2010 | Miyamoto .............. B23P 19/06 81/57.37 |
| 2011/0000300 A1* | 1/2011 | Isobe ................... G01N 29/262 73/625 |

(Continued)

FOREIGN PATENT DOCUMENTS

| DE | 198 43 162 A1 | 4/2000 |
| DE | 696 18 606 T2 | 9/2002 |
| DE | 10144508 A1 | 5/2003 |

(Continued)

OTHER PUBLICATIONS

German Patent Application No. 10 2015 105 687.9, Office Action dated Sep. 29, 2015, four (4) pages, English translation attached.

(Continued)

*Primary Examiner* — Adam Mott
(74) *Attorney, Agent, or Firm* — Nath, Goldberg & Meyer; Jerald L. Meyer; Stanley N. Protigal

(57) ABSTRACT

A robot includes a work tool that performs a work to a work point, and a moving unit that moves the work tool and changes the posture thereof. A console receives an operation to designate the coordinates of arbitrary two or three points on an inclined surface. Upon this operation, a processor calculates a direction of the work tool toward the work point from a work start point based on the coordinates of the arbitrary two or three points, next, a control unit moves the (Continued)

work tool to the work start point, directs the posture of the work tool toward the work point in accordance with the calculation by the processor, and causes the work tool to start a process to the work point.

7 Claims, 14 Drawing Sheets

(56) References Cited

U.S. PATENT DOCUMENTS

| | | | |
|---|---|---|---|
| 2015/0025549 A1* | 1/2015 | Kilroy | A61B 90/60 606/130 |
| 2015/0224649 A1* | 8/2015 | Watanabe | B25J 9/1607 700/259 |

FOREIGN PATENT DOCUMENTS

| | | |
|---|---|---|
| DE | 20 2011 103 223 U1 | 12/2012 |
| EP | 0455817 A1 | 11/1991 |
| EP | 1510893 A1 | 3/2005 |
| JP | 5-257522 A | 10/1993 |
| JP | 7-64619 A | 3/1995 |
| JP | 4222828 B2 | 2/2009 |
| TW | M483290 U | 8/2014 |
| TW | I453555 B | 9/2014 |

OTHER PUBLICATIONS

Office Action in corresponding Taiwan Application No. 104107479.

* cited by examiner

| ITEM NAME | VALUE | VARIABLE ID |
|---|---|---|
| LINEAR FORWARD AMOUNT (mm) | 6.0 | dScrewLine |
| FORWARD SPEED (mm/s) | 2.5 | dScrewSpeed |
| SCREW TIGHTENING LENGTH (mm) | 4.0 | dScrewLength |
| PRESSING AMOUNT (mm) | 0.5 | dScrewPress |
| SCREW-TIGHTENING COMPLETION WAITING TIME (sec) | 1.0 | dScrewFinTime |
| RETURN AMOUNT AFTER SCREW TIGHTENING (mm) | 10.0 | dScrewBack |
| RETURN SPEED (mm) | 30.0 | dScrewBackSpeed |

| POINT NUMBER 1 | POINT DATA ON WORK START POINT 1 | MOVEMENT INSTRUCTION TO WORK POINT 1 | WORK TOOL ACTUATION INSTRUCTION |
|---|---|---|---|
| POINT NUMBER 2 | POINT DATA ON WORK POINT 1 | WORK TOOL DEACTIVATION INSTRUCTION | |
| POINT NUMBER 3 | POINT DATA ON WORK START POINT 2 | MOVEMENT INSTRUCTION TO WORK POINT 2 | WORK TOOL ACTUATION INSTRUCTION |

| 61 | 322 | 633 | 634 | 635 |
|---|---|---|---|---|
| POINT NUMBER 1 | POINT DATA ON WORK POINT 1 | CALCULATION INSTRUCTION OF WORK START POINT TO WORK POINT 1 | MOVEMENT INSTRUCTION TO WORK START POINT RELATIVE TO WORK POINT 1 | WORK TOOL ACTUATION INSTRUCTION |
| POINT NUMBER 2 | POINT DATA ON WORK POINT 2 | CALCULATION INSTRUCTION OF WORK START POINT TO WORK POINT 2 | MOVEMENT INSTRUCTION TO WORK START POINT RELATIVE TO WORK POINT 2 | WORK TOOL ACTUATION INSTRUCTION |
| POINT NUMBER 3 | POINT DATA ON WORK POINT 3 | CALCULATION INSTRUCTION OF WORK START POINT TO WORK POINT 3 | MOVEMENT INSTRUCTION TO WORK START POINT RELATIVE TO WORK POINT 3 | WORK TOOL ACTUATION INSTRUCTION |

ROBOT

CROSS-REFERENCE TO RELATED APPLICATION

This application is based upon and claims the benefit of priority from Japan Patent Application No. 2014-209690, filed on Oct. 14, 2014, the entire contents of which are incorporated herein by reference.

FIELD OF THE INVENTION

The present disclosure relates to a robot operable with points designated through teaching.

BACKGROUND

Various industrial robots for screw tightening, welding and painting to a work-piece, carrying thereof, attachment of a part to the work-piece, and soldering, etc., include, for example, a vertical multi-jointed moving unit, move a work tool attached to the moving unit to a predetermined point, change the posture thereof, and actuate the work tool under a programmed control by a computer.

Control programs for robots are described by various robot languages, such as SLIM (Standard Language for Industrial Manipulators) and super SLIM. The major part of a programming is processes facing computer-aided tools including a code entry and a function calling through a keyboard and a GUI, but recording of points and postures is mainly carried out through a teaching.

In a teaching, a teaching engineer operates, using a computer-aided tool or a teaching pendant, a robot on a simulator, an emulator, or in an actual circumstance. The teaching engineer carries out JOG movement on a work tool to a desired point, takes the desired posture of the work tool, and records this point and this posture as point data. The point data is called at the time of the execution of a program. During this procedure, the controller of the robot tracks the movement of the moving unit when, for example, the robot language is based on the SLIM, analyzes the X, Y, and Z coordinates of a point and respective rotation angles of two axes, etc., representing the posture of the work tool, associates the analysis result with variables to be added to a Move instruction, etc., thereby recording the analysis result.

In the case of, for example, a screw tightening robot, the teaching engineer carries out a teaching for a screw tightening start point that is apart from a seating point by what corresponds to at least screw tightening length in the vertical direction. The teaching engineer moves the work tool in the X, Y, and Z directions, and rotates it in parallel with a horizontal plane and with a vertical plane with reference to the seating point while visually checking the condition, and aligns the work tool with the screw tightening start point.

When the seating point is present on the horizontal plane of a work-piece, it is fine for the teaching engineer if the teaching engineer only pays attention to the horizontal movement of the work tool. As to the height direction and posture of the work tool, simple operations that satisfy the numerical values are sufficient. In a case in which, for example, the work tool ascends by 1 mm if a +Z-direction button is depressed once, when the screw tightening length is 9 mm, after the work tool is located at the seating point, if the +Z-direction button is depressed nine times, the designation in the height direction can be completed. As to the rotation angle parallel to the vertical plane, it is fine if the work tool is simply returned to the initial value like a directly underneath location.

Hence, the screw tightening start point is present in an aerial region where there is no marking which indicates that point, but the teaching can designate the screw tightening point relatively easily and highly precisely. In cases in which, other than a screw tightening, a work point and a point where the work tool is to be located differ from each other and the point where the work tool is to be located is present in an aerial region without an apparent marking, but when the work point is present on a horizontal plane or a vertical plane, the teaching can be done relatively easily and highly precisely.

In recent years, demands are increasing for performing, using a robot, a work like a screw tightening on a multi-faced three-dimensional work-piece which has inclined surfaces directed at various inclination angles and in various directions. At the time of a programming, it is necessary to perform a teaching of directing the work tool that is located at, for example, a screw tightening start point to a work point which is apart from the work point like a screw tightening point on an inclined surface by an appropriate distance by what corresponds to a screw tightening length, etc., in the vertical direction.

In this teaching, it is necessary to measure the inclined surface of the work-piece by a visual check, and to obtain an appropriate image of a virtual line which interconnects the work tool with the work point and which is vertical to the inclined surface in order to precisely direct the work tool toward the work point. In addition, it is also necessary to appropriately calculate the moving amounts in the respective X, Y, and Z axes while applying a mathematical scheme like a trigonometric function to obtain a proper distance between the work tool and the work point.

Still further, the teaching of setting the posture of the work tool and that of setting the position thereof are unified procedures, and affect with each other. For example, even if a proper distance is obtained first, when the work tool is rotated around a motor shaft to change the posture, the obtained proper distance is changed.

In a teaching work, if an appropriate position of the work took is not taught, and the appropriate posture thereof is not taught, the angle of a screw becomes slightly misaligned with the seating point, and the screw tightening amount becomes insufficient, affecting the certainty of the screw tightening work. This remarkably affects the quality of a work done by a robot. Hence, when a work point is present on an inclined surface, the teaching work requires great patience to the teaching engineer.

The present disclosure has been made in order to address the aforementioned problems of the conventional technologies, and it is an objective of the present disclosure to provide a robot which can reduce the labor effort of a teaching that starts a process from a first point apart from an inclined surface in the vertical direction to a second point on the inclined surface, and which can accomplish a highly precise teaching.

SUMMARY OF THE INVENTION

To accomplish the above objective, a robot according to the present disclosure is configured to start a process from a first point which is apart from an inclined surface in a vertical direction to a second point on the inclined surface, and the robot includes: a work tool performing a work to the second point; a moving unit moving the work tool and changing a posture thereof; a console receiving an operation of designating coordinates of arbitrary two or three points on the inclined surface; a processor calculating, based on the coordinates of the arbitrary two or three points, a direction of the work tool toward the second point from the first point; and a control unit moving the work tool to at least the first point, directing the posture of the work tool toward the second point in accordance with a calculation result by the processor, and causing the work tool to start the process to the first point.

The robot may further include a data storing unit storing an apart distance between the first point and the second point, in which: the console may receive an operation of designating coordinates of the second point on the inclined surface; the processor may calculate, based on the coordinates of the second point, the coordinates of the arbitrary two or three points and the apart distance, coordinates of the first point; and the control unit may move the work tool to the first point in accordance with a calculation result by the processor.

The robot may further include a storage storing a control program in a description style that associates an instruction to each point of the work tool, in which the control unit may call the instruction in association with each point indicated by the control program in the storage, and may control the moving unit and the work tool.

The storage may store the control program that associates, one another, a calculation instruction to calculate coordinates of the first point relative to the second point, a movement instruction to move the work tool to the coordinates of the first point obtained by the calculation instruction, and operation instruction of the work tool.

The control unit may move, in accordance with an operation received by the console in a teaching mode, the work tool in a forward direction or in a reverse direction in the direction calculated by the processor.

The control unit may move, in accordance with an operation received by the console in a teaching mode, the work tool along the inclined surface that intersects at right angle with the direction calculated by the processor.

The console may include a converter converting, in a teaching mode, a coordinate system to a Cartesian coordinate system that has an axis which is the direction calculated by the processor; and the control unit receives an operation given to the console in the Cartesian coordinate system that has the axis which is the direction calculated by the arithmetic coordinate system in a teaching mode upon a coordinate-system conversion to the Cartesian coordinate system by the converter.

The control unit may rotate, in the teaching mode upon a coordinate-system conversion to the Cartesian coordinate system by the converter, the work tool around a tip thereof in accordance with an operation given to the console.

The work tool may be an electric screw driver; the second point may be a seating point of a screw; and the first point may be a location where the screw driver is located before starting a screw tightening.

The first point may be a location apart from the second point on the inclined surface in the vertical direction by a distance that is obtained by adding a preset buffer amount and a pressing amount to a screw tightening length.

According to the present disclosure, even if the work point is present on an inclined surface, a labor effort for designating the work start point where the work tool is to be located relative to the work point can be reduced, and the work certainty to the work point can be improved.

BRIEF DESCRIPTION OF THE DRAWINGS

FIG. 15A is a diagram illustrating a structure of the control program of the third embodiment;

FIG. 15B is a diagram illustrating a structure of the control program of the fourth embodiment;

DETAILED DESCRIPTION OF THE EMBODIMENTS

First Embodiment

Figure 1:
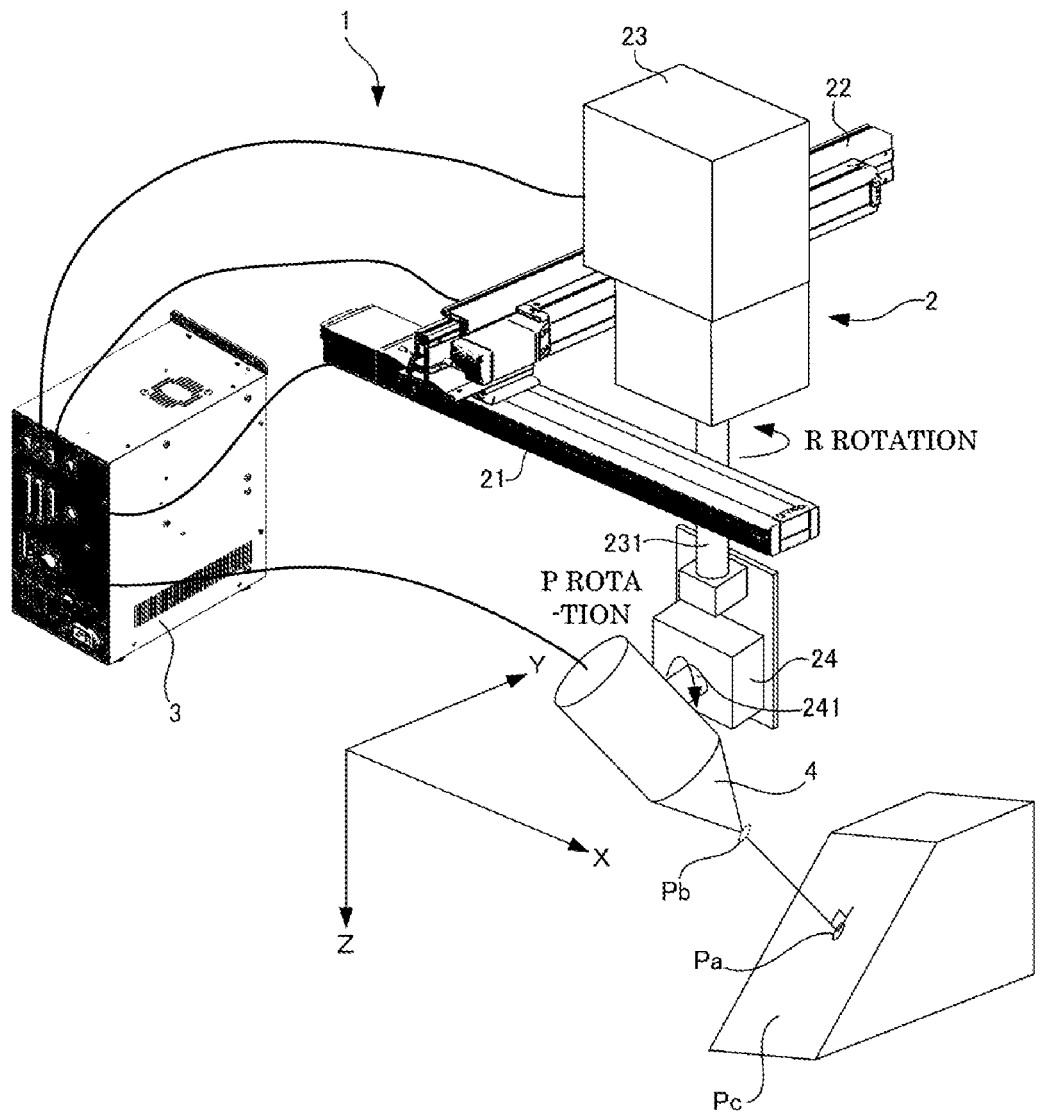
FIG. 1 is a whole configuration diagram of a robot according to a first embodiment of the present disclosure.
Figure 2A:
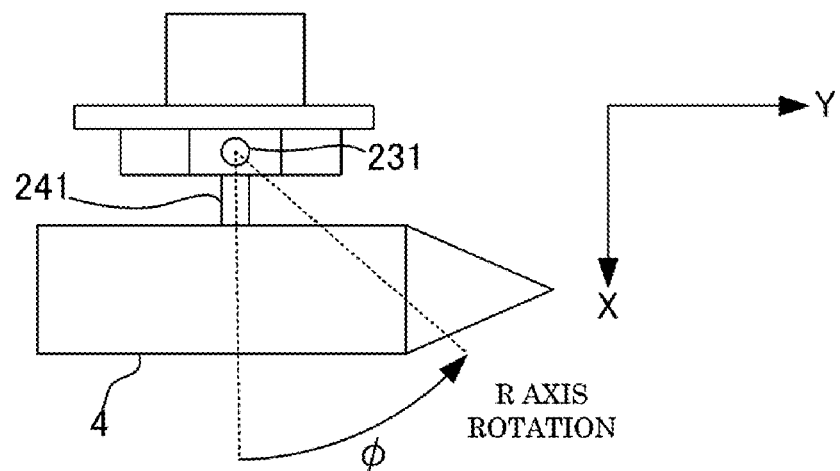
FIG. 2A is an enlarged diagram illustrating a work tool of the first embodiment.
Figure 2B:
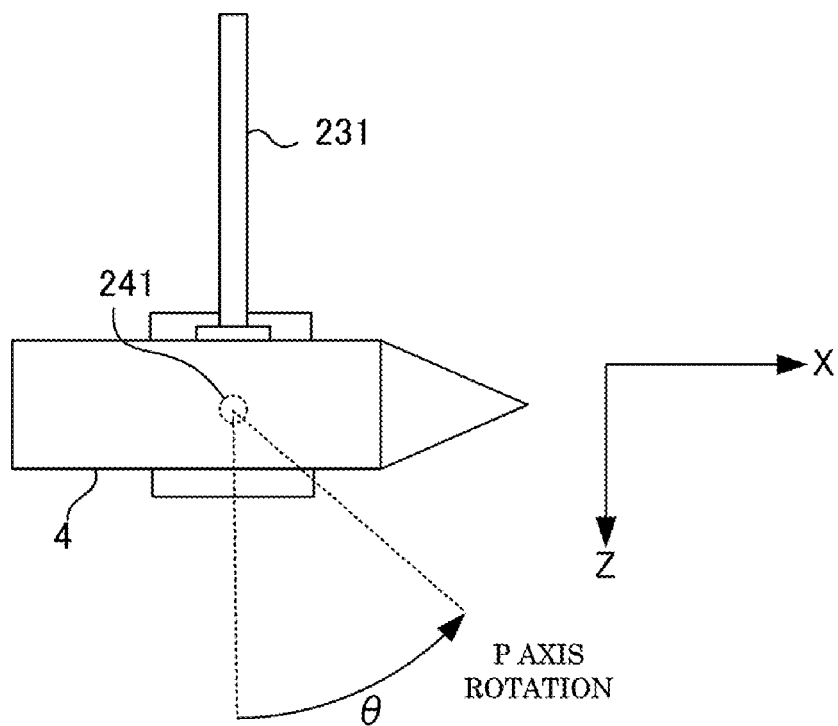
FIG. 2B is an enlarged diagram illustrating the work tool of the first embodiment.

A robot 1 according to a first embodiment of the present disclosure will be explained below in detail with reference to the drawings. FIG. 1 is a whole configuration diagram of the robot 1 of this embodiment, and FIGS. 2A, 2B are enlarged diagrams of a work tool 4, and are a plan view in an XY-plane direction viewed from directly above, and a side view in an XZ-plane direction viewed from directly laterally, respectively. As illustrated in FIG. 1, the robot 1 mainly includes a moving unit 2 and a controller 3, and starts a work to a work point Pa present on an inclined surface Pc of a work-piece from a work start point Pb. A work tool 4 is attached to the moving unit 2. The moving unit 2 moves the work tool 4 in X, Y, and Z directions so as to locate the work tool 4 at a designated point, and rotates (R rotation) the work tool 4 to change an azimuth angle φ, and rotates (P rotation) the work tool 4 to change an attack angle θ, thereby taking a designated posture of the work tool 4.

The work point Pa is a location where a work is to be done by the work tool 4. The work start point Pb is a location where the work tool 4 is located to start the work to the work point Pa. Example work tools 4 are an electric screw driver, a welder, a paint gun, and a handler, and the kind of the work tool 4 depends on the work task of the robot 1. An X-axis direction is an axial direction parallel to a horizontal plane, while a Y-axis direction is another axial direction which is parallel to the horizontal plane but intersects the X axis at right angle. A Z-axis direction is a height direction. The R rotation changes the azimuth angle φ while maintaining the horizontality, and the P rotation changes the attack angle θ while maintaining the verticality.

The moving unit 2 includes an X linear slider 21 that moves the work tool 4 in the X-axis direction, a Y linear slider 22 that moves the work tool 4 in the Y-axis direction, a ZR mechanism 23 which linearly moves the work tool 4 in the Z-axis direction, and which performs R rotation on the work tool 4, and a P-rotation mechanism 24 that performs P rotation on the work tool 4.

The X linear slider 21 has the Y linear slider 22 sliding on a rail that runs in the X-axis direction, and has the Y linear slider 22 fastened orthogonally with an endless belt that is driven in the X-axis direction. The endless belt is driven by an X-axis motor, thereby moving the Y linear slider 22 along the X axis.

The Y linear slider 22 has the ZR mechanism 23 sliding on a rail that runs in the Y-axis direction, and has the ZR mechanism 23 fastened with an endless belt that is driven in the Y-axis direction. This endless belt is driven by a Y-axis motor, thereby moving the ZR mechanism 23 along the Y axis. Example power transmission mechanisms to the X and Y linear sliders 21, 22 are, in addition to the endless belts, various actuators including cylinders and lead screws.

The ZR mechanism 23 includes, for example, a rack-and-pinion mechanism, has the rack extended in the Z-axis direction, and a bearing that rotatably supports an R rotation shaft 231 is fixed to the rack. When the pinion is rotated by a Z-axis motor, the R rotation shaft 231 is moved together with the bearing in the Z-axis direction, and when an R-rotation motor is rotated, the R rotation shaft 231 is subjected to an R rotation. The ZR mechanism 23 performs an R rotation on the work tool 4 to move in the Z-axis direction and to change the azimuth angle φ.

The P-rotation mechanism 24 is attached to the tip of the R rotation shaft 231 via a bracket, includes a P rotation shaft 241, and the work tool 4 is attached to the tip of the P rotation shaft 241. The bracket is fixed to the R rotation shaft 231, and is linked with the R rotation shaft 231. The P rotation shaft 241 is extended in the horizontal direction with the bracket being as a bearing, and is coupled with a P-rotation motor. The P-rotation mechanism 24 performs a P rotation on the work tool 4 to change the attack angle θ.

Figure 3:
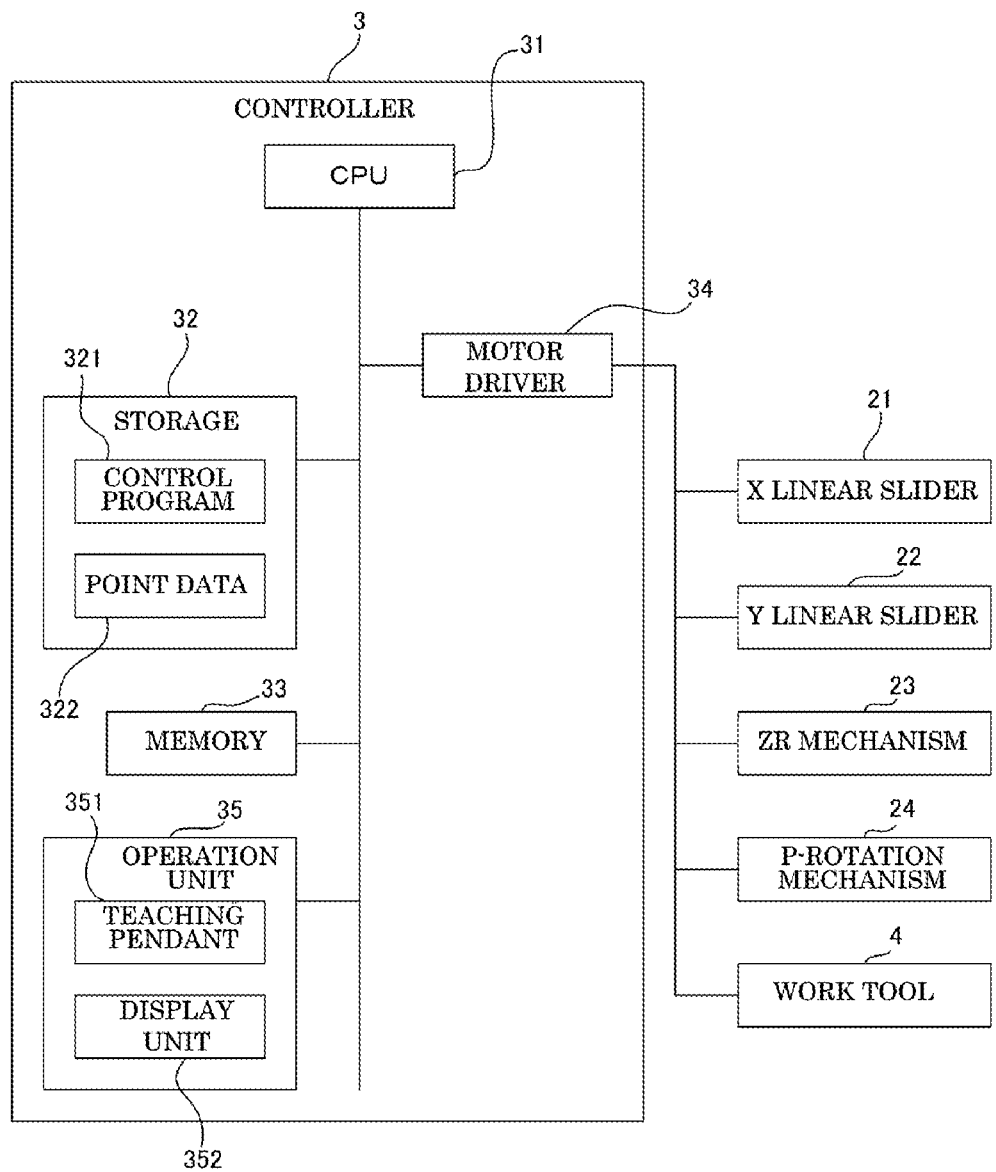
FIG. 3 is a configuration diagram of a controller of the first embodiment.

FIG. 3 is a configuration diagram of the controller 3. The controller 3 is a so-called computer, and includes a CPU 31 that performs arithmetic processing and outputs an instruction signal to a peripheral device in accordance with a program, a storage 32 like an HDD that stores the program, a memory 33 that expands therein the program and temporarily stores the arithmetic process result by the CPU 31, and the peripheral device. The peripheral device includes a motor driver 34 that supplies power pulses to the respective motors in accordance with an instruction signal, a display unit 352 like a liquid crystal display, and a console 35, such as a mouse, a keyboard, or a teaching pendant 351.

The controller 3 has an operation mode in accordance with a control program 321 for the moving unit 2 and the work tool 4, and a programming mode to enter the control program 321 for the moving unit 2 and the work too 4, and point data 322 on the work point Pa and the work start point Pb. The point data 322 contains the X, Y, and Z coordinate positions of the work start point Pb and those of the work point Pa, the azimuth angle φ of an R rotation and the attack angle θ of a P rotation. The programming mode also includes a teaching mode.

Figure 4:
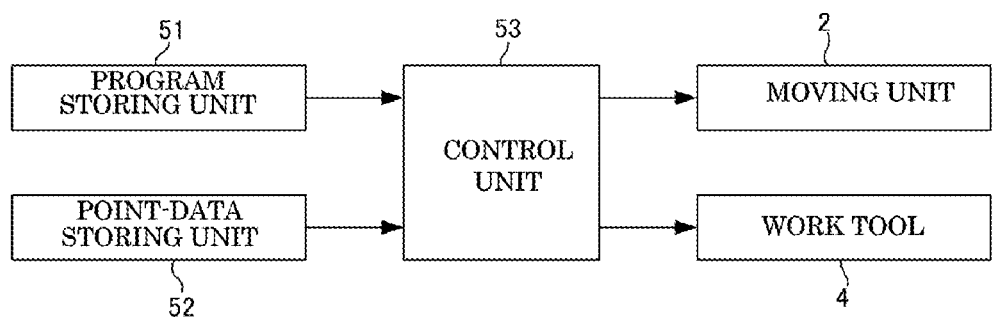
FIG. 4 is a functional block diagram in an operation mode of the controller of the first embodiment.

FIG. 4 is a functional block diagram illustrating a function of the controller 3. In the operation mode, the storage 32 or the memory 33 serves as a program storing unit 51 that stores the control program 321, and a point-data storing unit 52 that stores the point data 322, and the CPU 31 serves as a control unit 53 that reads the point data 322 stored in the point-data storing unit 52 as needed, performs arithmetic processes and outputs instruction signals to the peripheral device in accordance with the control program 321 stored in the program storing unit 51.

For example, the control program 321 described in the SLIM language is described mainly with instructions, such as a MOVE instruction, a work tool actuation instruction, and a control statement. The point-data storing unit 52 stores the point data 322 in association with point identification information. In the case of the MOVE instruction, the CPU 31 reads the point data 322 associated with the point identification information added to the MOVE instruction, and moves the work tool 4 to the position and posture represented by that point data 322 in accordance with the control program 321. That is, the CPU 321 in accordance with the control program 321 serves as the control unit 53 which moves the work tool 4, changes the posture thereof, and causes the work tool 4 to perform a work.

Figure 5:
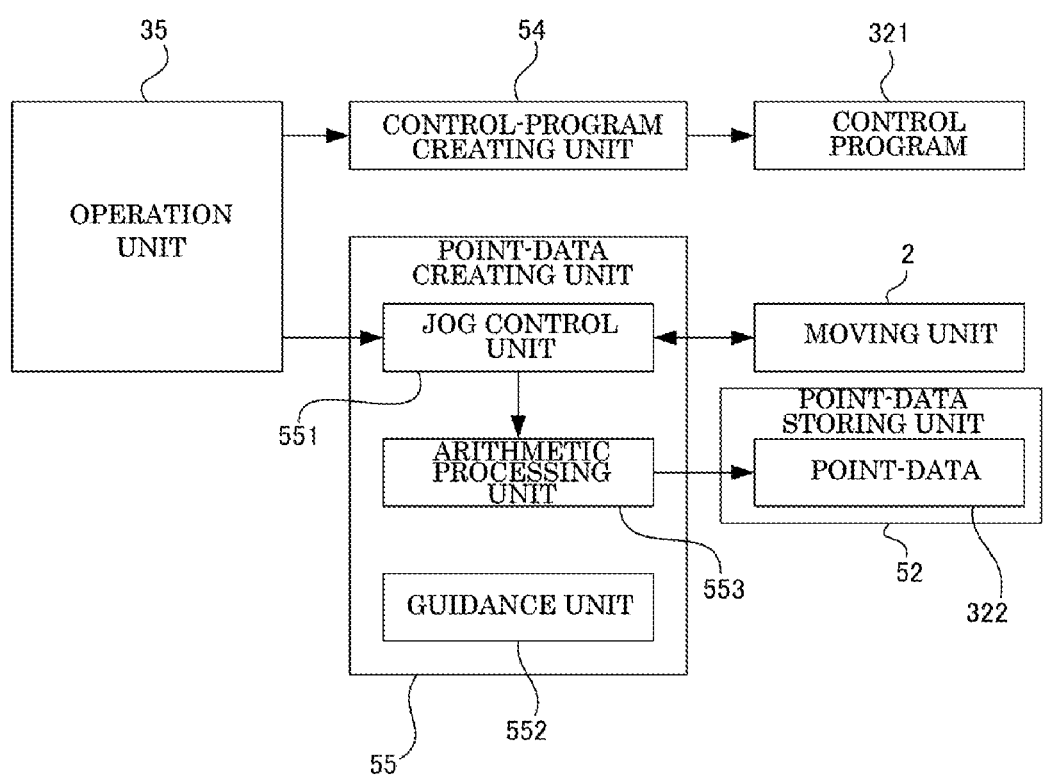
FIG. 5 is a functional block diagram in a programming mode of the controller of the first embodiment.

In the case of the programming mode, as illustrated in FIG. 5, the CPU 31 serves as a control-program creating unit 54 and a point-data creating unit 55. The control-program creating unit 54 adds, deletes, or corrects the codes of the control program 321 in accordance with an operation given to the teaching pendant 351, and the console 35 like the mouse or the keyboard, thereby editing the control program 321.

The point-data creating unit 55 calculates a point and a posture in the teaching mode, and stores those pieces of data in the point-data storing unit 52. The point-data creating unit 55 includes a JOG control unit 551, a guidance unit 552, and a processor 553. The JOG control unit 551 controls the moving unit 2 in response to an operation given to the teaching pendant 351, moves the work tool 4 and changes the posture thereof.

Figure 6:
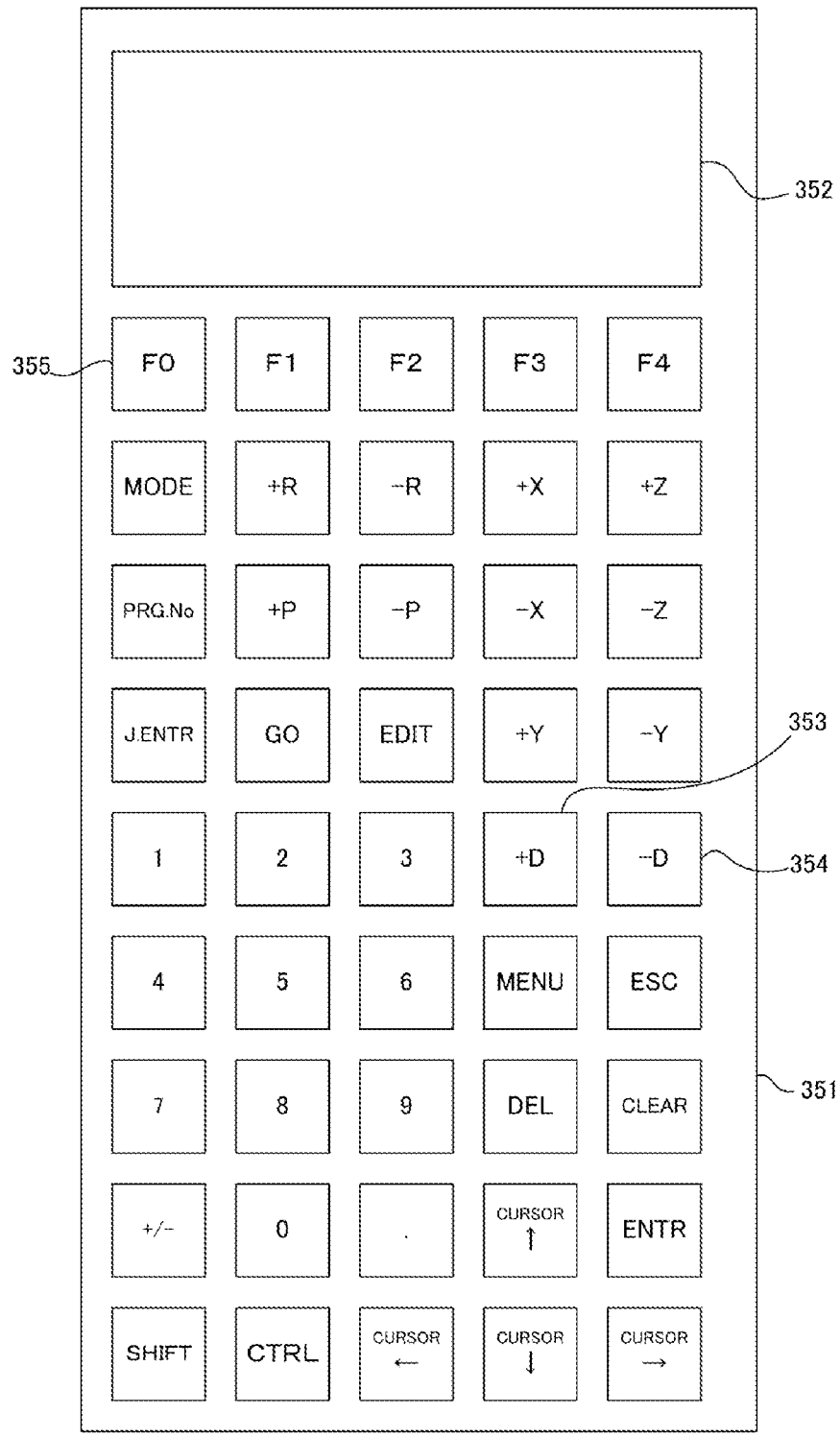
FIG. 6 is an exemplary diagram of a teaching pendant of the first embodiment.

FIG. 6 is an exemplary diagram illustrating a teaching pendant 351. As illustrated in FIG. 6, the teaching pendant 351 is provided with a button for a movement in the +X direction by a predetermined distance like 1 mm, a button for a movement in the −X direction by a predetermined distance like 1 mm, a button for a movement in the +Y direction by a predetermined distance like 1 mm, a button for a movement in the −Y direction by a predetermined distance like 1 mm, a button for a movement in the +Z direction by a predetermined distance like 1 mm, and a button for a movement in the −Z direction by a predetermined distance like 1 mm.

In addition, the teaching pendant 351 is provided with a button for a horizontal R rotation by a predetermined angle like 1 degree of the azimuth angle φ in the forward direction, a button for a horizontal R rotation by a predetermined angle like 1 degree of the azimuth angle ϕ in the reverse direction, a button for a vertical P rotation by a predetermined angle like 1 degree of the attack angle θ in the forward direction, and a button for a vertical P rotation by a predetermined angle like 1 degree of the attack angle θ in the reverse direction.

When, for example, the button for a movement in the +X direction by the predetermined distance like 1 mm is depressed once, an input signal that represents the depression of this button is generated by the teaching pendant 351, and is input to the CPU 31. The CPU 31 that functions as the JOG control unit 551 receives this input signal, calculates a motor rotation angle matching the predetermined distance like 1 mm, and outputs, to the motor driver 34, an instruction signal that represents the calculated rotation angle. The motor driver 34 receives the instruction signal, converts the rotation angle into pulse signals, and supplies the pulse signals to the X-axis motor of the X linear slider 21.

The guidance unit 552 guides the teaching engineer so as to enter necessary information to calculate a point and a posture. The CPU 31 that functions as the guidance unit 552 displays, on the display unit 352 of the teaching pendant 351, a message that prompts a JOG operation of designating the work point Pa on the inclined surface Pc where the work point Pa is present and arbitrary three points, and a message that prompts an operation to set an apart distance for spacing apart the work tool 4 from the work point Pa. The arbitrary three points may include the work point Pa.

In the case of a screw tightening work, the display unit 352 displays an area where a screw tightening length and a pressing amount can be entered. The pressing amount is a length of inserting a screw in a screw hole of the seating point without rotating the screw. The screw tightening length is a length obtained by subtracting the pressing amount from the nominal length, and is a length of inserting the screw in the screw hole of the seating point while rotating the screw.

Figures 7, 8:
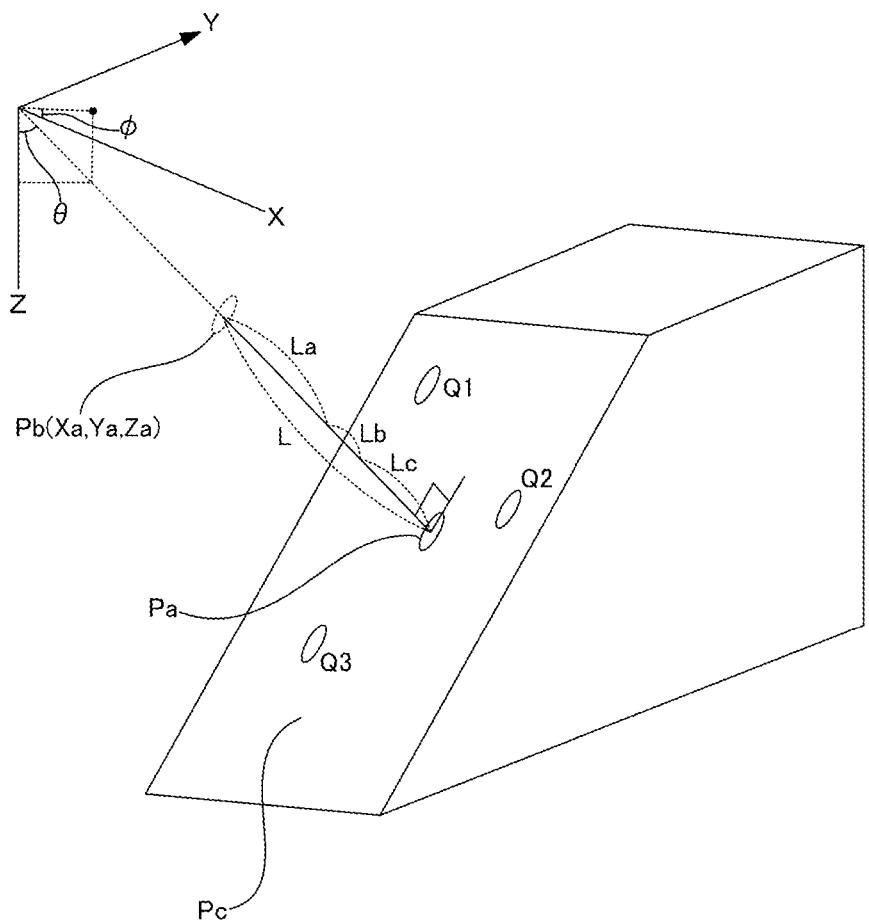
FIG. 7 is an explanatory diagram illustrating necessary parameters for screw tightening of the first embodiment.
FIG. 8 is an exemplary diagram illustrating an inclined surface and respective features set therearound of the first embodiment.

FIG. 7 illustrates other kinds of information that can be entered relating to a screw tightening. As illustrated in FIG. 7, for a screw tightening, a linear forward amount, a forward speed, a screw-tightening completion waiting time, a return amount after screw tightening, and a return speed. The linear forward amount is a distance obtained by adding the screw pressing amount and a buffer length to the screw tightening length. The screw-tightening completion waiting time is a timeout time to wait for a signal indicating the completion of a screw tightening. The return amount after screw tightening is a distance of retracting the work tool in order to release the screw from the driver of the work tool 4.

The teaching engineer operates the teaching pendant 351 in accordance with displayed information, and as illustrated in FIG. 8, causes the tip of the work tool 4 to contact the work point Pa and arbitrary three points Q1, Q2, and Q3 on the inclined surface Pc. The teaching engineer operates number keys of the keyboard or those of the teaching pendant in accordance with the displayed information, and enters the screw tightening length and the pressing amount.

The CPU 31 that serves as processor 553 calculates, based on the coordinates of the arbitrary three points Q1, Q2, and Q3, the vertical direction to the inclined surface Pc where the work point Pa is present. As illustrated in FIG. 8, this vertical direction is calculated as the azimuth angle ϕ of an R rotation and the attack angle θ of a P rotation. Next, the azimuth angle ϕ of the R rotation and the attack angle θ of the P rotation are included in the point data 322 as the posture of the work tool 4, and are stored in the point-data storing unit 52.

In addition, as illustrated in FIG. 8, the CPU 31 that serves as the processor 553 calculates the coordinates of the work start point Pb based on the apart distance L between the work tool 4 and the work point Pa, the vertical direction to the inclined surface Pc, and the coordinates of the work point Pa. Next, the coordinates of the work start point Pb are included in the point data 322, and are stored in the point-data storing unit 52.

An explanation will be given of a calculation method of the vertical direction by the processor 553, and a calculation method of the positional coordinates of the work start point Pb by the processor 553. As to the calculation of the vertical direction, an equation expressing the same plane as the inclined surface Pc may be obtained, and a straight line that intersects at right angle with the plane expressed by this equation may be obtained. For the equation expressing the inclined surface Pc, any methods, such as a method of utilizing a vector cross product and a normal vector, a method of solving simultaneous equations, and a method of solving a vector equation are applicable. In this embodiment, the method of solving simultaneous equations will be explained.

For the orthogonal straight line, any methods, such as a method of deriving the inclination of a cross line between the plane expressed by the equation of the inclined surface Pc and the XY plane, and an angle between that plane and the XY plane, and a method of deriving a vector intersecting at right angle with two vectors formed by the arbitrary three points Q1, Q2, and Q3 in the equation of the inclined surface Pc, are applicable. In this embodiment, the former method will be explained.

First, as illustrated in FIG. 8, appropriate three points that are not located on a straight line on the inclined surface Pc are designated. Those three points are optional as long as those are not aligned on a straight line. The respective coordinates of the three points will be defined as Q1 (X1, Y1, Z1), Q2 (X2, Y2, Z2), and Q3 (X3, Y3, Z3). For the equation of the inclined surface Pc, an equation of a plane that passes through those three points: Q1 (X1, Y1, Z1); Q2 (X2, Y2, Z2); and Q3 (X3, Y3, Z3) is obtained.

It is presumed that the equation of the same plane as the inclined surface Pc is defined as the following formula (1).

$$AX+BY+CZ+D=0 \tag{1}$$

Since the three points Q1, Q2, and Q3 are present on the inclined surface Pc, the respective coordinates of Q1, Q2, and Q3 are substituted in X, Y, and Z in the above-explained formula (1) to solve the following simultaneous equations (2) to (4).

$$AX1+BY1+CZ1+D=0 \tag{2}$$

$$AX2+BY2+CZ2+D=0 \tag{3}$$

$$AX3+BY3+CZ3+D=0 \tag{4}$$

In this case, D is set as a constant to associate the formulae (2) to (4) one another, and those formulae are solved for A, B, C, and D. In this case, the following formulae (5) to (8) can be obtained.

$$A=+Y1*Z2-Y1*Z3-Y2*Z1+Y2*Z3+Y3*Z1-Y3*Z2 \tag{5}$$

$$B=-X1*Z2+X1*Z3+X2*Z1-X2*Z3-X3*Z1+X3*Z2 \tag{6}$$

$$C=+X1*Y2-X1*Y3-X2*Y1+X2*Y3+X3*Y1-X3*Y2 \tag{7}$$

$$D=-X1*Y2*Z3+X1*Y3*Z2+X2*Y1*Z3-X2*Y3*Z1-X3*Y1*Z2+X3*Y2*Z1 \tag{8}$$

Since the plane which is in parallel with the inclined surface Pc and which passes through the origin satisfies D=0, a straight line formed by this plane that intersects with the XY plane can be expressed as the following formula (9) in association with the XY plane where Z=0.

$$Y=-(A/B)X \quad (9)$$

If an angle between this straight line and the X axis is defined as α, the following formula (10) can be derived.

$$\tan(\alpha)=-(A/B) \quad (10)$$

In addition, if an angle between the plane that is in parallel with the inclined surface Pc, and the XY plane is defined as β, the following formula (11) can be derived based on the rule.

$$\cos(\beta)=\pm C/\mathrm{sqrt}(A^2+B^2+C^2) \quad (11)$$

This angle α is the azimuth angle φ of the R rotation shaft 231 for directing the work tool 4 toward the inclined face Pc in the vertical direction. In addition, this angle β is the attack angle θ of the P rotation shaft 241 for directing the work tool 4 toward the inclined surface Pc in the vertical direction. The processor 553 sets those calculation results that are the angle α and the angle β as the azimuth angle φ of the R rotation shaft 231, and the attack angle θ of the P rotation shaft 241. Those angles are included in the point data 322 on the work start point Pb, and are stored in the point-data storing unit 52.

The coordinates X, Y, and Z of the work start point Pb are obtained by a calculation through the following formulae (12) to (14) with reference to the work point Pa. In the formulae, L is an apart distance from the work point Pa. The processor 553 calculates in advance the apart distance that is a value obtained by La+Lb+Lc where La is an entered screw tightening length, Lb is a preset buffer amount, and Lc is the pressing amount in such a way that a screw does not scratch the inclined surface Pc.

$$Xa=L*\sin(\theta)*\sin(\phi) \quad (12)$$

$$Ya=L*\sin(\theta)*\cos(\phi) \quad (13)$$

$$Za=L*\cos(\theta) \quad (14)$$

The processor 553 includes the respective values of Xa, Ya, and Za in the point data 322 on the work start point Pb, and stores such data in the point-data storing unit 52.

Figure 9:
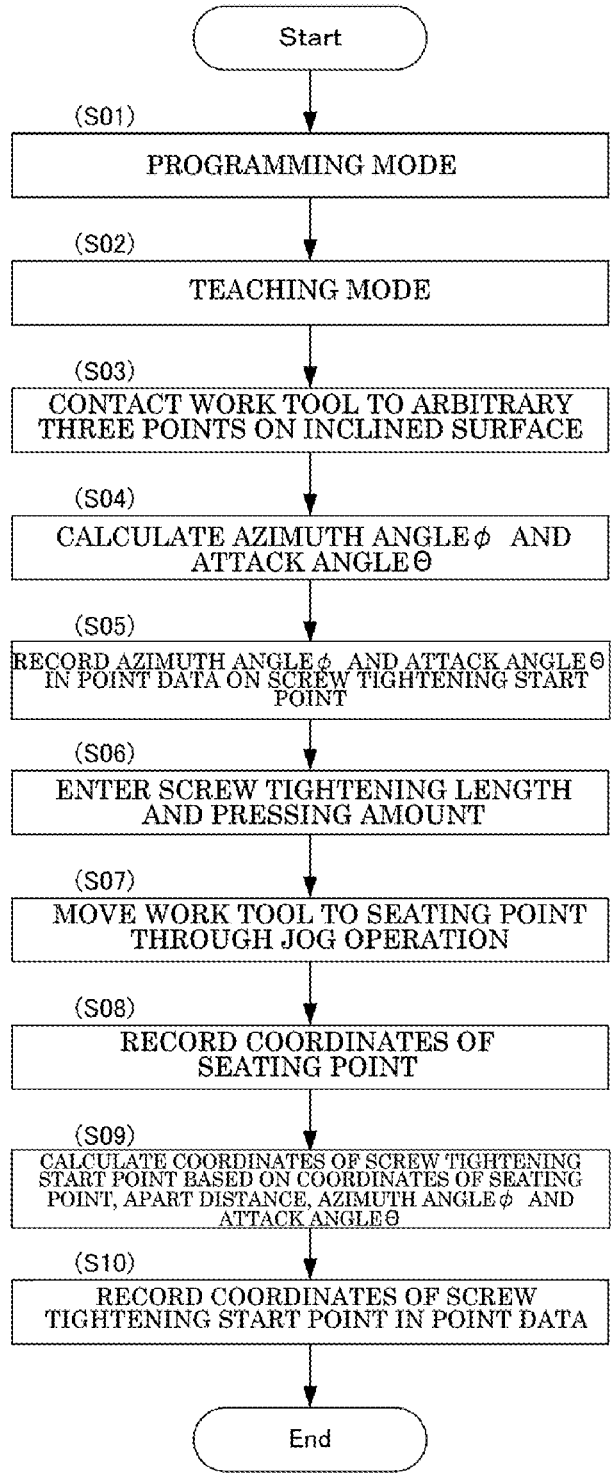
FIG. 9 is a flowchart illustrating a registration operation of a work start point Pb for the robot of the first embodiment.

As to the operation of the robot 1, an explanation will be given of an example case in which a screw tightening start point that is the work start point Pb is entered relative to the work point Pa which is the seating point on the inclined surface Pc. FIG. 9 is a flowchart illustrating an enter operation of the work start point Pb.

First, the teaching engineer operates the teaching pendant 351, and the function of the controller 3 is switched from the current mode to the programming mode (step S01) or to the teaching mode (step S02).

In the teaching mode, when the teaching pendant 351 is operated, the control unit 53 moves the moving unit 2 in accordance with the given operation, and causes the work tool 4 to sequentially contact arbitrary three points on the inclined surface Pc in accordance with the operation (step S03). At this time, the control unit 53 analyzes the movement amounts of the work tool 4 in the X, Y, and Z axis directions through, for example, an encoder, and stores the coordinate information on the arbitrary three points in the memory 33.

When the coordinate information on the three points on the inclined surface Pc is analyzed, the processor 553 calculates (step S04), based on the coordinate information on the three points, the azimuth angle φ component and the attack angle θ component of the vertical direction to the inclined surface Pc. The azimuth angle φ and the attack angle θ that are the calculation results are recorded in (step S05) the point data 322 represented by a variable name that is declared as the screw tightening start point.

Still further, when the teaching pendant 351 is operated and the screw tightening length and the pressing amount are entered (step S06), the processor 553 stores information on the screw tightening length and information on the pressing amount in the memory 33.

Next, when the teaching pendant 351 is operated, the control unit 53 moves the moving unit 2 in accordance with the given operation, and locates the work tool 4 at the seating point on the inclined surface Pc in accordance with the given operation (step S07). At this time, the control unit 53 analyzes the movement amounts of the work tool 4 in the X, Y, and Z axis directions through the encoder, and stores the coordinate information on the seating point in the memory 33 (step S08).

Subsequently, the processor 553 calculates (step S09), based on the length that is obtained by adding the buffer amount to the screw tightening length, the coordinate information that indicates the seating point of a screw, and the azimuth angle φ and attack angle θ both indicating the vertical direction to the inclined surface Pc, the coordinates of the screw tightening start point. The coordinates of the screw tightening start point that are the calculation results are recorded in (step S10) the point data 322 represented by a variable name that is declared as the screw tightening start point.

Through the above-explained operations, the coordinates of the screw tightening start point when a screw is tightened at the seating point on the inclined surface Pc, and the posture of the work tool 4 are recorded as the point data 322. As explained above, the robot 1 that includes the work tool 4, the moving unit 2, and the controller 3 includes the console 35 which receives, in the teaching mode, an operation of designating arbitrary three points on the inclined surface Pc, and the processor 553 which calculates, in the teaching mode, also, a direction directed from the work start point Pb toward the work point Pa based on the arbitrary three points. The robot 1 moves the work tool 4 to at least the work point Pa, changes the posture of the work tool 4 so as to be directed toward the work point Pa in accordance with the calculation by the processor 553, and causes the work tool 4 to start a process on the work point Pa.

According to this configuration, in order to direct the work tool 4 toward the work point Pa, it becomes unnecessary to perform teaching while visually checking the inclined surface Pc and the work tool 4 through a trial and error process, and by simply designating arbitrary three points on the inclined surface Pc, the work tool 4 can be precisely directed toward the work point Pa. That is, a teaching of directly designating the posture of the work tool 4 can be eliminated, reducing the labor effort of the teaching engineer, and also improving the work certainty to the work point Pa.

In addition, according to this robot 1, the apart distance between the work start point Pb and the work point Pa is stored in advance, and when the console 35 receives an operation of teaching the coordinates of the work point Pa on the inclined surface Pc, the coordinates of the work start point Pb are calculated based on the coordinates of the work point Pa, the coordinates of the arbitrary three points, and the apart distance.

Accordingly, in order to find a point at which the work tool 4 is apart from the work point Pa in the vertical direction by the predetermined distance, it becomes unnecessary to perform teaching while visually checking the work point Pa and the work tool 4 in a trial and error process, but it is fine if only the unambiguous work point Pa is designated and the numeric value of the apart distance is entered. That is, a teaching of directly designating the work start point Pb can be eliminated, the work tool 4 can be precisely located in the vertical direction relative to the work point Pa, and can be apart therefrom by the appropriate distance. Hence, the labor effort of the teaching engineer can be reduced, and the work certainty to the work point Pa can be improved.

Figure 10:
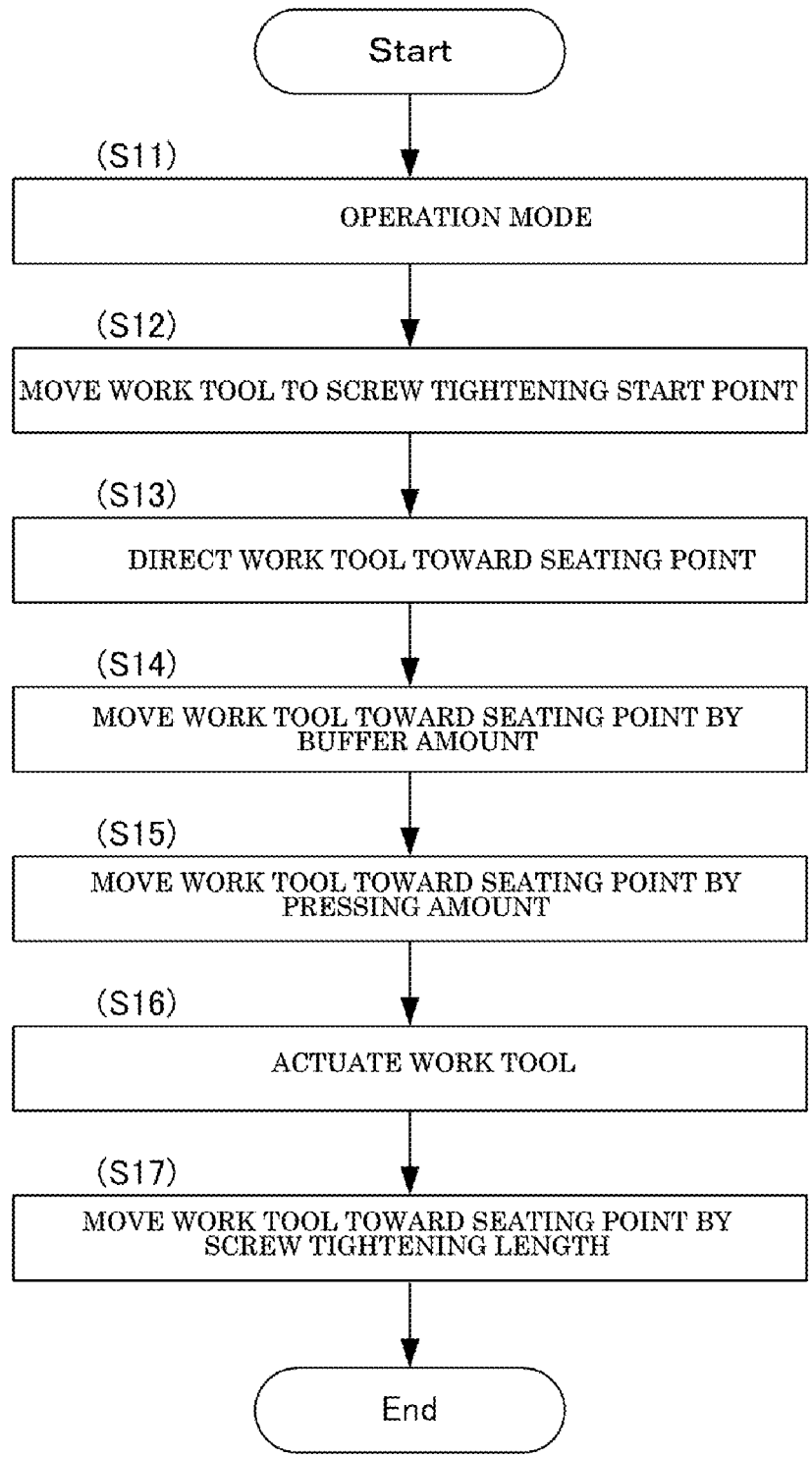
FIG. 10 is a flowchart illustrating a screw tightening operation by the robot of the first embodiment.

Next, an explanation will be given of a screw tightening operation by the robot 1 in accordance with the control program 321. FIG. 10 is a flowchart illustrating the screw tightening operation by the robot 1 in accordance with the control program 321. First, the teaching engineer operates the teaching pendant 351, and the function of the controller 3 is changed to the operation mode (step S11).

In the operation mode, the CPU 31 of the controller 3 locates (step S12) the work tool 4 at the screw tightening start point in accordance with the control program 321, and directs (step S13) the work tool 4 toward the seating point. At this time, the distance between the work tool 4 and the seating point is set as the apart distance that is obtained by adding the pressing level and the buffer amount to the screw tightening length.

Next, the CPU 31 moves (step S14) the work tool 4 toward the seating point by the buffer amount. At this time, the tip of a screw reaches the screw hole at the seating point. Subsequently, the CPU 31 moves (step S15) the work tool 4 by the pressing amount toward the seating point. At this time, the screw is pressed in the screw hole at the seating point.

Next, the CPU 31 moves (step S17) the work tool 4 toward the seating point by the screw tightening length while rotating (step S16) the driver of the work tool 4. This forward movement is performed at the forward speed. Thereafter, when a torque-up is detected, it is determined that the screw tightening is finished, and the work tool 4 is retracted by the backward amount after screw tightening. This retract movement is performed by the backward amount after screw tightening. When a torque-up is undetectable during the screw tightening completion waiting time, the robot 1 determines that an error occurs.

Hence, the screw is seated in the screw hole formed in the inclined surface Pc. When there are multiple seating points, the controller 3 locates the work tool 4 in the vertical direction to each seating point in accordance with the control program 321, directs the work tool 4 toward each seating point, moves the work tool 4 by the buffer amount, the pressing amount, and further moves the work tool 4 by the screw tightening length while rotating the driver relative to each seating point.

As explained above, in the robot 1, for example, the work tool 4 is a screw driver, the work point Pa is the seating point of a screw, and the work start point Pb is a position where the screw driver is located at the time of the start of screw tightening. In this case, the work start point Pb is located at a position that is apart from the screw seating position by a distance which is obtained by adding the preset buffer amount and the pressing amount to the screw tightening length.

In this screw tightening work, the apart distance obtained by adding the buffer amount and the pressing amount to the screw tightening length is different from both of the nominal length of the screw and the total length thereof, and has no clear reference. Hence, according to the robot 1, the screw tightening work to the inclined surface Pc becomes remarkably precise, and the labor effort to enter the work start point Pb can be remarkably reduced.

Second Embodiment

Next, a robot 1 according to a second embodiment of the present disclosure will be explained in detail with reference to the drawings. The same configuration and function as those of the first embodiment will be denoted by the same reference numerals, and the duplicated detailed explanation thereof will be omitted.

Figure 11:
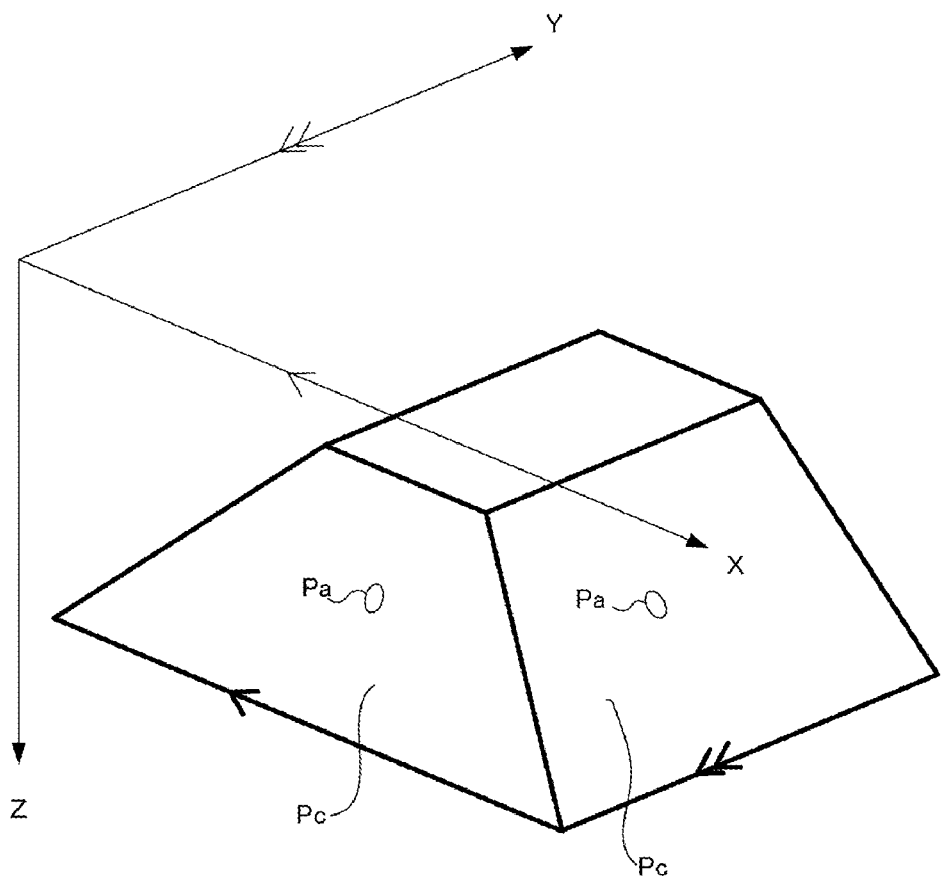
FIG. 11 is an exemplary diagram illustrating a work-piece according to a second embodiment of the present disclosure.

FIG. 11 is an exemplary diagram illustrating a work-piece subjected to a work to be done by the robot 1 of this embodiment. As illustrated in FIG. 11, depending on how the work-piece is mounted, and what shape the work-piece has, the work point Pa may be located on an inclined surface Pc that is parallel to the Y-axis or an inclined surface Pc that is parallel to the X-axis. The vertical direction to the inclined surface Pc which is in parallel with the Y-axis, and the vertical direction to the inclined surface Pc which is in parallel with the X-axis have the settled azimuth angle φ that is 0 degree, 90 degrees, 180 degrees, or 270 degrees, and the precise azimuth angle φ can be set through a visual check by the teaching engineer. The remaining parameter that is difficult for the teaching engineer to set is the attack angle θ.

When the work point Pa is located on the inclined surface Pc which is in parallel with the Y-axis, or on the inclined surface Pc which is in parallel with the X-axis, the processor 553 of the robot 1 calculates the attack angle θ of the vertical direction to the inclined surface Pc based on the coordinates of arbitrary two points on the inclined surface Pc. The teaching engineer enters, through the console 35, the azimuth angle φ, and the JOG operation for the moving unit 2. The guidance unit 552 displays a message that prompts the teaching engineer to set the arbitrary two points so as to have different heights on the inclined surface Pc. The control unit 53 moves, in response to the JOG operation, the work tool 4 to the arbitrary two points on the inclined surface Pc, and outputs the respective coordinates of the arbitrary two points. The processor 553 calculates the attack angle θ based on the coordinates of the arbitrary two points on the inclined surface Pc, and records such an angle in the point data 322 together with the azimuth angle φ.

The calculation by the processor 553 can be performed through either a geometric mathematical scheme or a vector scheme, etc. As an example, when the inclined surface Pc runs in parallel with the Y axis, a difference ΔZ between the respective Z-axis coordinates of the arbitrary two points, and a difference ΔX between the respective X-axis coordinates of the arbitrary two points are calculated to solve the following formula (15).

$$\theta = 2/\pi - \arctan(\Delta Z/\Delta X) \quad (15)$$

In addition, as another example, when the inclined surface Pc runs in parallel with the X axis, the difference ΔZ between the respective Z-axis coordinates of the arbitrary two points, and a difference ΔY between the respective Y-axis coordinates of the arbitrary two points are calculated to solve the following formula (16).

$$\theta = 2/\pi - \arctan(\Delta Z/\Delta Y) \quad (16)$$

As explained above, when the inclined surface Pc which enables the teaching engineer to assume an appropriate azimuth angle φ has the work point Pa thereon, the console 35 receives an operation of designating the coordinates of arbitrary two points on the inclined surface Pc, and the processor 553 can calculate a direction from the work start point Pb to the work point Pa based on the coordinates of the arbitrary two points. Hence, the number of points to be designated on the inclined surface Pc can be reduced, thereby further reducing the labor effort of the teaching engineer.

When the inclined surface Pc stands upright and obliquely intersects with the X axis and the Y axis, the attack angle θ is always directly lateral. Hence, it is appropriate if arbitrary two points are designated at different locations on the inclined surface Pc in the directly lateral direction to calculate the azimuth angle φ.

Third Embodiment

Next, a robot 1 according to a third embodiment of the present disclosure will be explained in detail with reference to the drawings. The same configuration and function as those of the first embodiment will be denoted by the same reference numerals, and the duplicated detailed explanation thereof will be omitted.

In general, a program language like SLIM is described mainly with instructions like MOVE instruction to the robot 1. The work start point Pb and the work point Pa are handled merely as constants and variables to an instruction like the MOVE instruction, and the contents of the point identification information and those of the point data 322 are simply embedded in the program.

Figure 12:
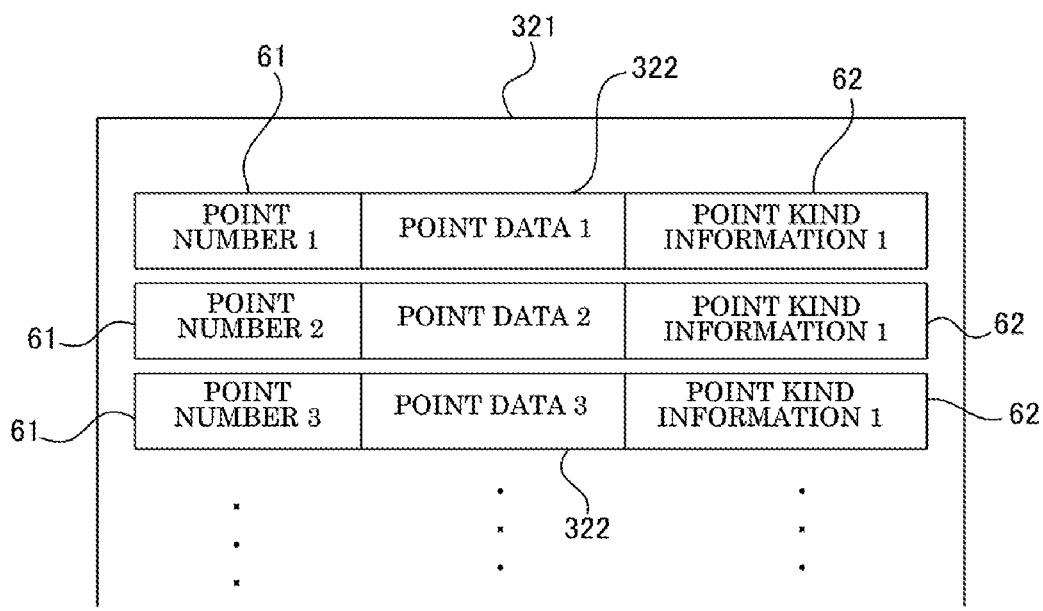
FIG. 12 is a structural diagram illustrating a control program according to a third embodiment of the present disclosure.

Hence, according to the robot 1 of the third embodiment, the CPU 31 functions as the control-program creating unit 54 that creates the control program 321 in a location-based description style. FIG. 12 is an exemplary diagram illustrating this control program 321. As illustrated in FIG. 12, the control program 321 is described so as to add point kind information 62 and the point data 322 to a point number 61.

The point number 61 identifies the work start point Pb or the work point Pa. The point kind information 62 is a function name of a process program to be executed at the point that is indicated by the point number 61. The point data 322 contains X, Y, and Z coordinates that represent the position of the point indicated by the point number 61 and the posture of the work tool 4, the azimuth angle φ of an R rotation, and the attack angle θ of a P rotation.

The control-program creating unit 54 registers the point number 61 in accordance with an operation given to the console 35, enters the identification information on the point data 322 to be added to the point number 61, stores the point data 322 corresponding to that identification information through the teaching mode or a numerical value entering, and registers the point kind information 62 to be added to the point number 61. In addition, the control-program creating unit 54 edits, in accordance with an enter operation through a keyboard, etc., a work instruction 63 indicated by the point kind information 62.

Figure 13:
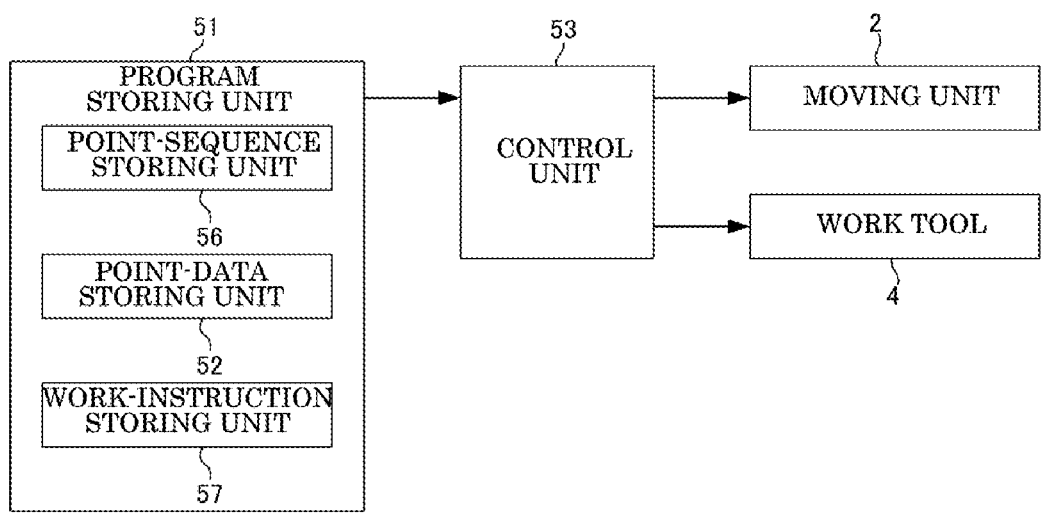
FIG. 13 is a functional block diagram illustrating a controller of the third embodiment.

That is, the program storing unit 51 like the HDD mainly includes, as illustrated in FIG. 13, a point-sequence storing unit 56 that stores the control program 321, the point-data storing unit 52 that stores the point data 322, and a work-instruction storing unit 57 that stores codes of the work instruction 63 indicated by the point kind information 62.

The CPU 31 functions as the control unit 53 that calls, in the order of the point number 61 in the point-sequence storing unit 56, the point data 322 added to the point number 61 and the work instruction 63, substitutes respective contents of the point data 322 in the parameters in the process program as needed, thereby controlling the moving unit 2 and the work tool 4.

As explained above, the control program 321 registers the point number 61 that represents the work start point Pb and the work point Pa, and adds the point data 322 and the point kind information 62 to the point number 61. That is, unlike the SLIM language that associates "location" with reference to "things to do", this control program 321 employs a description style that associates "things to do" with reference to "location". This matches the way of thinking by an engineer when the engineer operates the robot 1, remarkably facilitating the programming.

However, the control program 321 is described with reference to "location", it is necessary to enter the work start point Pb and the work point Pa, i.e., in the case of a screw tightening, a screw tightening start point and a seating point. Hence, when the work point Pa is present on the inclined surface Pc, and the work start point Pb is present in a space above the work point Pa in the vertical direction, the control program 321 may increase the labor effort of programming.

According to the robot 1 of this embodiment, however, in the teaching mode, an operation of designating the coordinates of arbitrary two or three points on the inclined surface Pc is received, and a direction of the work tool 4 toward the work point Pa is calculated based on the coordinates of the arbitrary two or three points. In addition, in the teaching mode, an operation of teaching the coordinates of the work point Pa on the inclined surface Pc is received, and the coordinates of the work start point Pb are calculated based on the coordinates of the work point Pa, the coordinates of the arbitrary two or three points, and the apart distance between the work start point Pb and the work point Pa.

Hence, application of this control program 321 remarkably reduces the labor effort of the teaching engineer.

Fourth Embodiment

Next, a robot 1 according to a fourth embodiment of the present disclosure will be explained in detail with reference to the drawings. The same configuration and function as those of the first and third embodiments will be denoted by the same reference numerals, and the duplicated detailed explanation thereof will be omitted.

Figure 14:
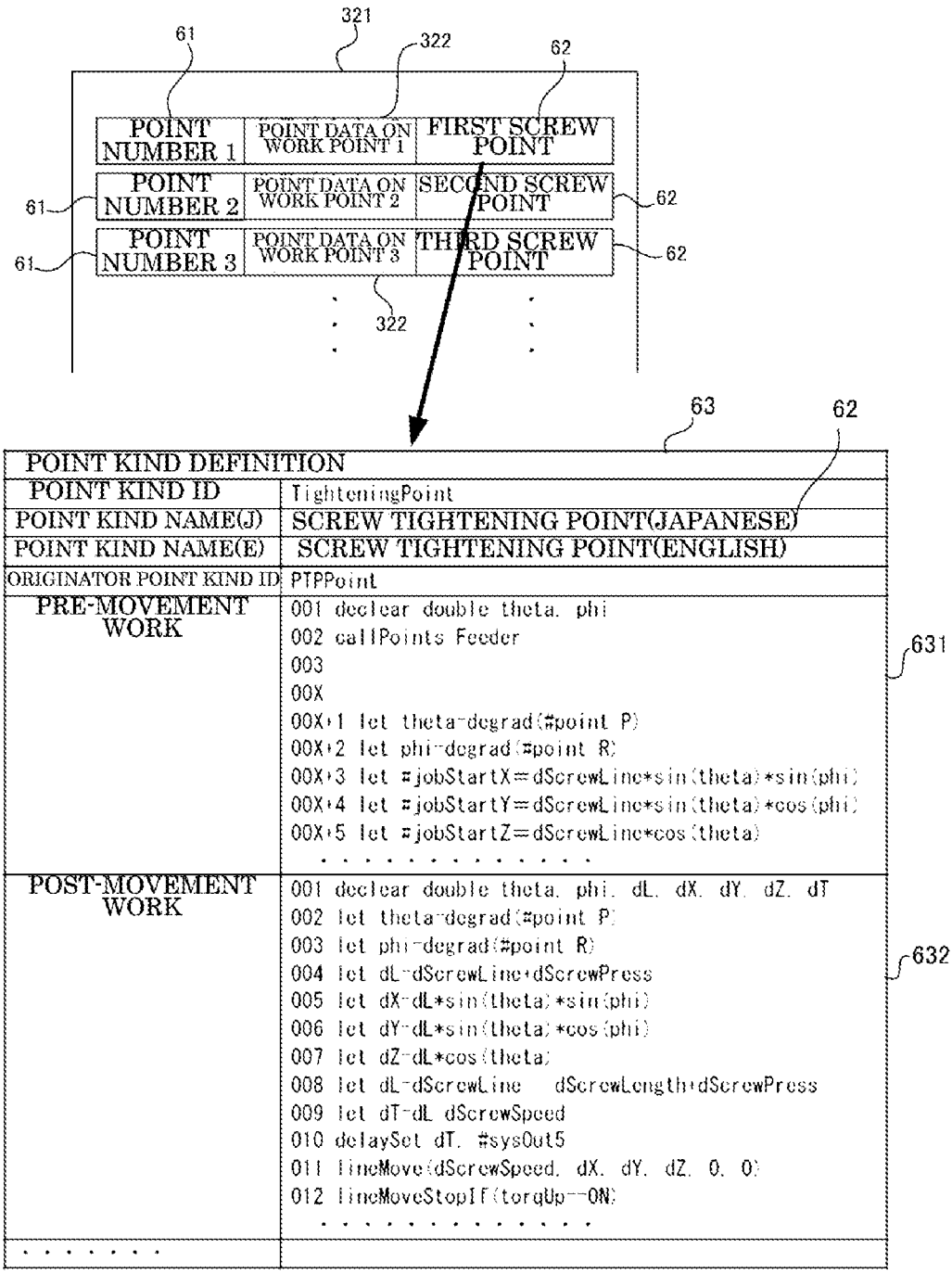
FIG. 14 is a structural diagram illustrating a work instruction of a control program according to a fourth embodiment of the present disclosure.

FIG. 14 illustrates a work instruction 63 created by the control-program creating unit 54. The work instruction 63 is contained in the control program 321 in a location-based description style. The work instruction 63 is associated with the point number 61 that indicates the work point Pa which is the seating point of a screw, and is identified by the point kind information 62 associated with the point number 61. The work instruction 63 is described with the screw seating point as the point kind information 62, i.e., the contents to be associated with the seating point.

As illustrated in FIG. 14, the contents to be associated with the seating point are described with an instruction sequence 631 of pre-movement work, and an instruction sequence 632 of post-movement. The instruction sequence 631 of pre-movement work is processed by the CPU 31 that functions as the control unit 53 before the movement to the seating point. The instruction sequence 631 of post-movement is described with, in line 002, an instruction of an operation of taking out a screw from a feeder like "callPoints Feeder". In accordance with this instruction, the control unit 53 controls the moving unit 2 to take out the screw from the feeder, which is a work to the work point Pa that is the screw seating point.

Next, after the line 003, an instruction to calculate the coordinates of the work start point Pb and an instruction to calculate the direction of the work tool 4 are described. That is, the processor 553 is realized by the CPU 31 which executes the control program 321 that controls the moving unit 2 and the work tool 4 in the operation mode.

As an example, the azimuth angle φ of an R rotation and the attack angle θ of a P rotation are calculated between the line 003 to the line 00X. Next, after the line 00X+1, the processor 553 converts, through a degrad function, #point_R and #point_P that are system functions which returns the azimuth angle φ and the attack angle θ of a p rotation into radians, and substitutes such radians into local variables that are theta and phi through let theta=degrad(#point_P) and let phi=degrad("point_R).

Subsequently, according to the instruction in the subsequent three lines, the processor 553 calculates coordinates X, Y, and Z that represents the location of the work tool 4, and substitutes the coordinates in special system variables that are #jobStartX, #jobStartY, and #jobStartZ. Note that L is the apart distance between the work start point Pb and the work point Pa.

$$\#jobStartX=L*\sin(\theta)*\sin(\phi)$$

$$\#jobStartY=L*\sin(\theta)*\cos(\phi)$$

$$\#jobStartZ=L*\cos(\theta)$$

The special system variables that are #jobStartX, #jobStartY, and #jobStartZ are referred prior to the movement to the work point Pa, and are values for advancing the movement to coordinates offset by what corresponds to the system variables. That is, by controlling the moving unit 2, the control unit 53 moves the work tool 4 to a screw tightening start point, which is a work to the seating point of a screw. In other words, the control unit 53 moves the work tool 4 to the work start point Pb as a work to the work point Pa.

Next, in the instruction sequence 632 of post-movement, i.e., in the instruction sequence to be executed after the work tool 4 is moved to the screw tightening start point, first, in the line 004, the contents of calculation to add the pressing amount dScrewPress to dScrewLine which is obtained by adding the buffer amount to the screw length, thereby calculating an apart distance dL are described. In addition, in the lines 005 to 007, the contents of calculation of respective movement amounts dX, dY, and dZ in the X, Y, and Z axis directions from the point where the work tool 4 is located to the work point Pa are described. The processor 553 executes those instructions, thereby calculating the movement amounts to reach the work point Pa.

Still further, the processor 553 that executes the line 008 and the line 009 calculates a movement time corresponding to the buffer amount and the pressing amount, and the control unit 53 that executes the line 010 moves the work tool 4 from the point where the work tool 4 is located toward the work point Pa by the buffer amount and the pressing amount.

Subsequently, the control unit 53 that executes the instruction "lineMove (dScrewSpeed, dX, dY, dZ, 0, 0)" in the line 011 moves the work tool 4 in the X, Y, and Z axis directions by dX, dY, and dZ that represent the respective distances to the work point Pa while rotating the screw driver at a rotating speed substituted into dScrewSpeed. Eventually, the control unit 53 that executes the line 012 receives a torque-up signal that indicates the completion of screw tightening, thereby terminating the movement of the work tool 4 to the work point Pa and the actuation thereof.

In this case, in a description style programming, what will be done at the work point Pa is taken into consideration. Hence, if there is a description relating to the work point Pb and in association with the work point Pa, the meaning of this code is understandable. Conversely, if there is a code of the work start point Pb which is irrelevant to the work point Pa, it takes a great time to understand the meaning.

However, unlike the control program illustrated in FIG. 15A, as illustrated in FIG. 15B, the control-program creating unit 54 associates, to the work point Pa, a calculation instruction 633 to calculate the coordinates of the work start point Pb, a movement instruction 634 to move the work tool 4 to the coordinates of the work point Pa obtained by the execution of the calculation instruction 633, and an actuation instruction 635 of the work tool 4, thereby creating the control program 321.

According to the control program 321 created by the control-program creating unit 54, the program seems like only a description of codes related to the seating point where a work is actually to be performed, and it becomes unnecessary to take into consideration the point that is the work start point Pb not directly related to the work. Hence, the creation of the control program 321 in this description style is further facilitated, and thus the labor effort at the time of programming can be further reduced.

More specifically, when a program for a screw tightening work is created, it is fine for a programmer if the programmer designate the multiple point numbers 61 only by what corresponds to the number of seating points where screw holes are present, respectively, and it is unnecessary to designate the point number 61 of another point where the work tool 4 is to be located. In addition, it is fine if only program kind information for a screw tightening work is associated with the designated point number 61, and it is unnecessary to associate a program of starting the rotation of the driver to start a screw tightening work, and a program of rotating the driver to finish the screw tightening.

Fifth Embodiment

Next, a robot 1 according to a fifth embodiment of the present disclosure will be explained in detail with reference to the drawings. The same configuration and function as those of the first to fourth embodiments will be denoted by the same reference numerals, and the duplicated detailed explanation thereof will be omitted.

FIG. 6 is a diagram illustrating the configuration of the teaching pendant 351. As illustrated in FIG. 6, the teaching pendant 351 includes a forward direction advance button 353, a reverse direction retract button 354, and a coordinate-system convert button 355.

When the forward direction advance button 353 or the reverse direction retract button 354 is depressed, the JOG control unit 551 solves the following formulae (17) to (19) based on pieces of information on a movement amount L per a pitch, the azimuth angle φ, and the attack angle θ. Note that φa is an azimuth angle representing the current direction of the work tool 4, while θa is an attack angle also representing the direction of the work tool 4.

$$Xa=L \cos \phi a \qquad (17)$$

$$Ya=L \sin \phi a \qquad (18)$$

$$Za=L \sin \phi a \qquad (19)$$

The JOG control unit 551 outputs, after the movement amount Xa, the movement amount Ya, and the movement amount Za are obtained, an instruction signal of moving the X linear slider 21 by the movement amount Xa, an instruction signal of moving the Y linear slider 22 by the movement amount Ya, and an instruction signal of moving the ZR mechanism 23 by the movement amount Za.

Figure 16:
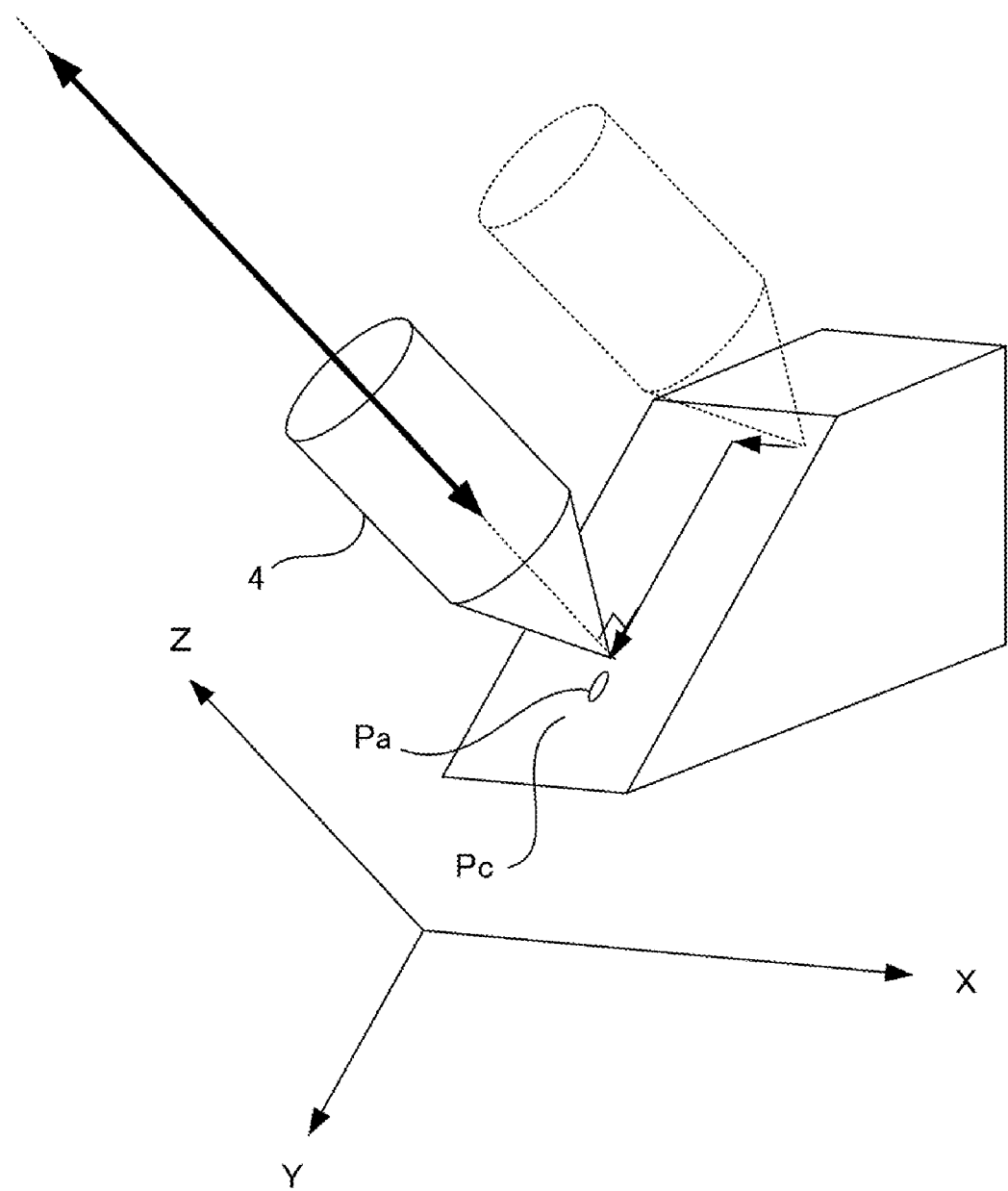
FIG. 16 is an exemplary diagram illustrating a moving direction of a work tool according to a fifth embodiment of the present disclosure.

That is, when the forward direction advance button 353 is depressed, as illustrated in FIG. 16, the JOG control unit 551 moves the work tool 4 in the forward direction that is in parallel with the direction of the work tool 4. When the reverse direction retract button 354 is depressed, the work tool 4 is moved in the reverse direction in parallel with the direction of the work tool 4. The forward direction is from the rear end of the work tool 4 to the front end thereof, while the reverse direction is from the front end of the work tool 4 to the rear end thereof.

When the work tool 4 is directed in the vertical direction to the inclined surface Pc where the work point Pa is present upon designation of arbitrary two or three points on the inclined surface Pc, the JOG control unit 551 moves the work tool 4 in the vertical direction to the inclined surface Pc.

Next, when the coordinate-system convert button 355 is depressed, the JOG control unit 551 converts, with respect to the X, Y, and Z axes, the coordinate system defined by the direction in which the Y liner slider 22 and the R rotation shaft 231 extend into a coordinate system defined by the inclined surface Pc where the work point Pa is present and the vertical direction to the inclined surface Pc. Through this coordinate-system conversion, as illustrated in FIG. 16, the vertical direction to the inclined surface Pc becomes the Z axis, and the two axes which intersect with each other at right angle and which also intersect with the Z axis at right angle become the X axis and the Y axis.

The JOG control unit 551 converts the coordinate system based on the azimuth angle φ and the attack angle θ obtained by designating arbitrary two or three points on the inclined surface Pc. Next, after the coordinate-system convert button is depressed, the JOG control unit 551 moves the work tool 4 in parallel with the inclined surface Pc in accordance with the depression of buttons of the teaching pendant 351 for instructing the movements in the X-axis direction and in the Y-axis direction.

As explained above, according to this robot 1, in the teaching mode, the work tool 4 is moved in, in accordance with the operation given to the console 35, the forward direction and the reverse direction in the direction calculated by the processor 553. In addition, in the teaching mode, the coordinate system is converted into the Cartesian coordinate system having the direction calculated by the processor 553 as an axis, and the work tool 4 is moved along, in accordance with the operation given to the console 35, the inclined surface Pc orthogonal to the direction calculated by the processor 553.

Hence, after the direction of the work tool 4 is changed to the vertical direction to the inclined surface Pc by designating the arbitrary two or three points on the inclined surface Pc, the teaching of the work point Pa becomes easy. This further reduces the labor effort of the teaching engineer, improves the teaching precision of the work point Pa, and increases the work certainty.

Sixth Embodiment

Next, a robot 1 according to a sixth embodiment of the present disclosure will be explained in detail with reference to the drawings. The same configuration and function as those of the fifth embodiment will be denoted by the same reference numerals, and the duplicated detailed explanation thereof will be omitted.

Figure 17:
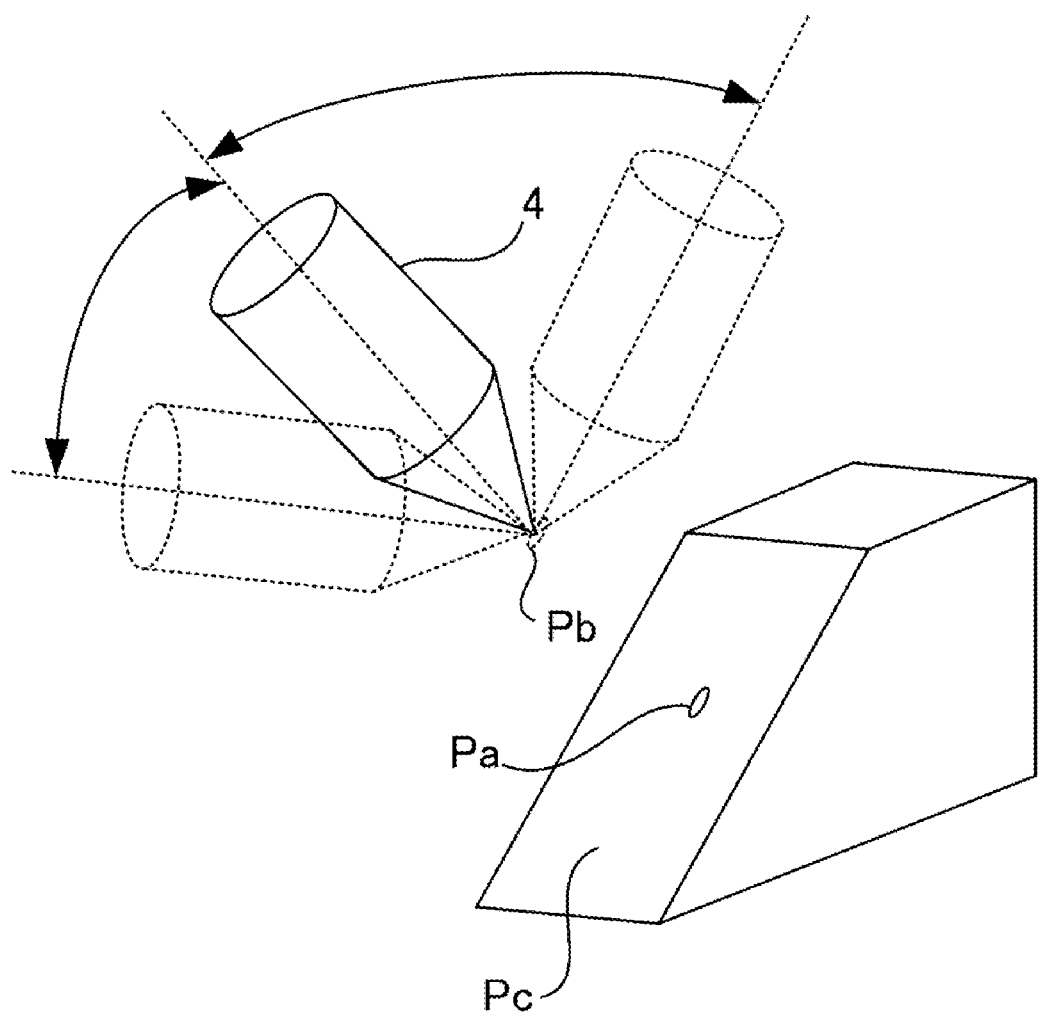
FIG. 17 is an exemplary diagram illustrating a rotation of a work tool and a movement thereof according to a sixth embodiment of the present disclosure.

According to this robot 1, when an R rotation or P rotation operation is given, as illustrated in FIG. 17, the JOG control unit 551 controls the moving unit 2 so as to rotate the work tool 4 around the tip thereof with the position of the tip thereof being fixed. The JOG control unit 551 has the storage 32 that has stored in advance a tool-center-point set value of the work tool 4.

The tool-center-point set value is attach information on the work tool 4. The tool-center-point set value contains the X, Y, and Z coordinate values of an intersection between the R rotation shaft 231 and the P rotation shaft 241 when the azimuth angle φ and the attack angle θ, at which the work tool 4 is directed toward the directly underneath space, are both zero, an X-axis component Lx and a Y-axis component Ly between the intersection and the tip of the work tool 4, and a distance Ld from an intersection of a virtual line which passes through the tip of the work tool 4 and which intersects with the extended line of the P rotation shaft 241 at right angle to the tip of the work tool 4.

At this time, the coordinates (Xt, Yt, Zt) of the tip of the work tool 4 can be expressed by the following formulae (20) to (22).

$$Xt = X0 + Lx^*\cos(\phi) + Ly^*\sin(\phi) + Ld^*\sin(\theta)^*\cos(\phi) \tag{20}$$

$$Yt = Y0 + Lx^*\sin(\phi) + Ly^*\cos(\phi) + Ld^*\sin(\theta)^*\sin(\phi) \tag{21}$$

$$Zt = Z0 + Ld^*\cos(\theta) \tag{22}$$

When, for example, an operation with a change in the azimuth angle φ from φ1 to φ2, or an operation with a change in the attack angle θ from θ1 to θ2 is given, through the above-explained formulae (20) to (22), the tip of the work tool 4 is to be moved from T1 (Xt1, Yt1, Zt1) to T2 (Xt2, Yt2, Zt2). The JOG control unit 551 controls the X linear slider 21, the Y linear slider 22, and the ZR mechanism 23, and moves the work tool 4 in the X, Y, and Z axis directions so as to move from T2 (Xt2, Yt2, Zt2) to T1 (Xt1, Yt1, Zt1).

As explained above, the robot 1 moves the work tool 4 in the X, Y, and Z axis directions so as to cancel the displacement of the position of the tip of the work tool 4 originating from a rotation. That is, in the teaching mode, the work tool 4 is rotated around the tip thereof in accordance with an operation given to the console 35.

Although the work point Pa is the primary concern, there are, for example, desires to apply a laser marking to a position apart from the work point Pa. In this case, when the direction angle of the work tool 4 that has been directed toward the work point Pa from the vertical direction to the inclined surface Pc is changed, the position of the tip of the work tool 4 is displaced, and thus a bothersome fine adjustment is sometimes necessary. According to this robot 1, however, even if the direction angle of the work tool 4 is changed, the position of the tip of the work tool 4 is steady. Hence, the labor effort of the teaching engineer can be remarkably reduced, and the teaching precision can be further remarkably improved.

Other Embodiments

The embodiments of the present disclosure were explained above, but various omissions, replacements, and modifications can be made without departing from the scope of the present disclosure. Such embodiments and modified embodiments thereof are within the scope of the present disclosure, and are also within the scope of the appended claims and the equivalent range thereto.

For example, the explanation was given of an example case in which a programming that includes a registration of the point data 322 to the robot 1 is directly performed thereon, but the present disclosure is not limited to this example case, and the programming may be performed through a programming tool other than the robot 1, and the control program 321 and the point data 322 may be loaded in the robot 1.

What is claimed is:

1. A robot configured to start a process from a start point which is apart from an inclined surface to an operation point on the inclined surface in a direction perpendicular to the inclined surface, the robot comprising:
    a work tool performing a work to the operation point;
    a moving unit having a mechanism moving the work tool in a X-axis direction, a mechanism moving the work tool in a Y-axis direction, a ZR mechanism moving the work tool in a Z-axis direction while R rotating the work tool, and a P rotation mechanism P rotating the work tool;
    a console receiving an operation of contacting a tip of the work tool to coordinates of arbitrary two or three points on the inclined surface and the operation point of the inclined surface from a teaching by an engineer;
    a data storing unit storing the coordinates of arbitrary two or three points on the inclined surface the tip of the work tool contacted, a coordinate of the operation point, and a distance between the start point and the operation point;
    a processor calculating an axial direction which the work tool faces the operation point from the start point based on the coordinates of arbitrary two or three points, while calculating the coordinate of the start point based on the coordinates of arbitrary two or three points and the distance between the start point and the operation point; and
    a control unit moving the work tool to the start point, directing the posture of the work tool toward the operation point in accordance with the axial direction calculated by the processor, and moving the work tool to the coordinate of the start point.

2. The robot according to claim 1, wherein the control unit moves, in accordance with an operation received by the console, the work tool in the axial direction and in a reverse direction thereof calculated by the processor.

3. The robot according to claim 1, wherein the control unit moves the work tool in a direction perpendicular to the axial direction calculated by the processor.

4. The robot according to claim 1, wherein:
    the console comprises a converter converting a coordinate system to a Cartesian coordinate system that has an axis in the axial direction calculated by the processor; and
    the control unit receives an operation related to processes the work tool performs from the console at the time of the work of the work tool in the Cartesian coordinate system that has the axis in the axial direction calculated by the converter after a coordinate-system conversion to the Cartesian coordinate system by the converter.

5. The robot according to claim 4, wherein the control unit rotates after the conversion to a coordinate-system conversion to the Cartesian coordinate system by the converter, the work tool around a tip thereof.

6. The robot according to claim 1, wherein:
    the work tool is an electric screw driver;
    the operation point is a seating point of a screw; and
    the start point is a location where the screw driver is located before starting a screw tightening.

7. The robot according to claim 6, wherein the start point is a location apart from the operation point in the perpendicular direction to the inclined surface by a distance that is obtained by adding a preset buffer amount and a pressing amount to a screw tightening length.

* * * * *